United States Patent [19]
Yunoki

[11] Patent Number: 5,408,518
[45] Date of Patent: Apr. 18, 1995

[54] TELECONFERENCE SYSTEM FEATURING A CALL-UP

[75] Inventor: Hideo Yunoki, Kawasaki, Japan

[73] Assignee: Fujitsu Limited, Kawasaki, Japan

[21] Appl. No.: 910,771

[22] Filed: Jul. 8, 1992

[30] Foreign Application Priority Data

Jul. 9, 1991 [JP] Japan .................. 3-168425

[51] Int. Cl.6 .................. H04M 3/50; H04M 3/56
[52] U.S. Cl. .................. 379/67; 379/84;
379/202; 379/207
[58] Field of Search ............... 379/202, 204, 207, 201,
379/230, 67, 84

[56] References Cited

U.S. PATENT DOCUMENTS

| | | | |
|---|---|---|---|
| 4,550,224 | 10/1985 | Winchell | 379/202 |
| 4,600,814 | 7/1986 | Cunniff | 379/202 X |
| 4,796,293 | 1/1989 | Blinken et al. | 379/202 |

FOREIGN PATENT DOCUMENTS

| | | |
|---|---|---|
| 58-39155 | 3/1983 | Japan . |
| 63-124656 | 5/1988 | Japan . |
| 63-244961 | 10/1988 | Japan . |
| 1-264464 | 10/1989 | Japan . |

Primary Examiner—Thomas W. Brown
Attorney, Agent, or Firm—Staas & Halsey

[57] ABSTRACT

When a teleconference sponsor wishes to have an SCP (service control point) for controlling an IN (intelligent network) service reserve a teleconference run, a teleconference reservation notifier in a teleconference registerer has the teleconference sponsor input data on the date and time of the teleconference run and data on the names of teleconference participants. This registers the teleconference, and notifies all the teleconference participants of a schedule of the teleconference run. When a teleconference participant wishes to receive data on the date and time of a teleconference run, a teleconference status confirmer in the teleconference registerer reads the registered data of the teleconference run, thereby notifying the interrogating teleconference participant. When a teleconference participant cannot attend a teleconference, a teleconference absence notifier in the teleconference registerer receives his absence notice, and notifies all other attending teleconference participants of his absence. On reaching the reserved date and time of a registered teleconference, a teleconference executor in the SCP automatically puts all the attending teleconference participants online. An SCP controller in the SCP performs the entire control of the teleconference registerer and the teleconference executor, as well as an interface with an exchange. The IN call processor in the exchange performs the interface with the exchange by a conversion between a message for use by the SCP and a message for use by the exchange, which is a conventional exchange.

6 Claims, 10 Drawing Sheets

CASE OF SENDING ORDINARY ROUTINE ANNOUNCEMENT

CASE OF SENDING PARAMETERED ANNOUNCEMENT

CASE OF VOICE RECORDING

TELECONFERENCE SYSTEM FEATURING A CALL-UP

BACKGROUND OF THE INVENTION

1. Field of the Invention

This invention pertains to a teleconference system featuring a call-up. It can realize, without negatively affecting the efficiency of an existing exchange, a function of registering the participants and the date and time of a teleconference; a function of automatically notifying an invitation to, a cancellation of, an absence from and a status confirmation of a teleconference; and a function of automatically holding a teleconference by calling up the participants for an online connection at a specified time on a designated date.

2. Description of the Related Arts

With the advancement and furtherance of telephone services, a teleconference service has currently been put into use. A conventional teleconference service uses a teleconference starting system by which a call originating user personally calls up the participants in sequence for having them connected online.

However, such a system has a problem of functional complication, because it requires the call originating user to call up all the participants one by one at the specified time on the designated date.

To overcome this problem, a system has been invented for automatically setting the communications paths of a teleconference, such that a call originating user registers in a teleconference system in an exchange, the participants and the date and time of a teleconference, so that the teleconference system calls up the participants on the date and time of the teleconference. (Refer to Japanese Patent Application Circulars (A) No. 1988-244961 and No. 1989-264464.)

The invention described in Japanese Patent Application Circular (A) No. 1988-244961 purports to enable the participants to be automatically connected online on the registered time of date, by having an automatic private branch exchange realize a function of storing the date and time of a teleconference run and automatically calling up the telephone sets of the participants on the date and time of a teleconference run, a function of automatically connecting the lines from the telephone sets of the responding ones of the participants to the teleconference communications paths, and a function of enabling the mutual communications among the participants.

The invention described in Japanese Patent Application Circular (A) No. 1989-264464 comprises a teleconference sponsor's telephone set having a monitor for displaying data from the exchange and a voice storer connected to a main communications path switch of the exchange, in addition to having the above functions. This connects the participants to be automatically called up at the time and date of a teleconference run, the message recorded by the teleconference sponsor in the voice storer to be sent to the responding ones of the participants, and the status data of the responding ones of the participants to be displayed on the telephone set having a monitor.

As described above, the conventional systems cause the exchange to have the function for storing the data on the participants and the date and time of a teleconference run and the function for automatically connecting the participants online on the date and time of the teleconference run. Because an exchange must realize these functions in addition to its indigenous functions, a potential problem exists that the exchange may become less efficient in executing its basic jobs.

In addition, the conventional systems require a process for having a subscriber who will be absent inform the teleconference sponsor of his absence, thereby having the teleconference sponsor eliminate the name of the nonparticipating subscriber from the participants' name list registered in the exchange. Also, because his absence cannot be notified in a batch to other participants, the subscriber who will be absent must inform each of the attending participants of his absence either directly in person or indirectly via the teleconference sponsor.

SUMMARY OF THE INVENTION

This invention aims at enabling an exchange to automatically hold a teleconference at the specified time on the designated date by reserving a teleconference run, realizing an efficient teleconference service by issuing an absence notice in a batch to all other participants when a scheduled participant cannot attend the teleconference, and developing a system void of efficiency deterioration caused by a functional complication of a conventional exchange by these services.

This invention is premised on an exchange comprising a switching matrix, a VRE (Voice Response Equipment) unit having a recording function, and a call processing unit, in addition to a SCP (Service Control Point) for executing IN (Intelligent Network) services such as a teleconference service provided outside of the exchange.

The SCP comprises a teleconference registerer for registering in its internal database teleconference data (the participants' names and the date and time of the teleconference run) dictated by a terminal (used by the teleconference sponsor) connected to the exchange, for answering the inquiry from a teleconference participant about the specifics of the teleconference by reading the pertinent data from the database, and for deleting from the database the name of a participant absenting the teleconference after notifying the attending participants of his/her absence.

The SCP also comprises a teleconference executor for running a teleconference by connecting their lines after calling up each of the attending participants on the date and time of the teleconference run registered in the database.

The SCP further comprises a SCP controller for controlling the teleconference registerer and the teleconference executor and for interchanging instructions with the exchange as its interface.

On receipt of a request (a request for reserving a teleconference, a request for confirming the teleconference status or a request for notifying an absence from a teleconference) from any among the group of terminals, sent via the exchange, the SCP controller invokes a teleconference reservation notifier, a teleconference status confirmer and a teleconference absence notifier (described later). Also, the SCP controller invokes the teleconference executor on the date and time of the teleconference registered in the database.

Finally, the exchange comprises an IN call processor for processing the interface between the exchange and the SCP by performing a mutual conversion between an instruction of the conventional exchange, and an IN message of the SCP. Because the exchange is a conventional exchange, it cannot process an IN message used by the SCP. Therefore, the IN call processor replaces an IN message received from the SCP with an instruction processable by the exchange and sends an instruction from the exchange to the SCP by converting it to an IN message.

The teleconference registerer may be formed by three parts explained in the above description of the configuration of this invention. More specifically, the teleconference registerer comprises the teleconference reservation notifier for registering the participants and the date and time of a teleconference run, the teleconference status confirmer for responding to a participant's request for teleconference data, and the teleconference absence notifier for allowing the absence of an absenting subscriber to be notified.

The teleconference reservation notifier registers the participants' names and the date and time of a teleconference run in a database, notifies respective participants of a teleconference run, records in the VRE unit a teleconference sponsor's voice message, and then sends respective participants the teleconference sponsor's voice message which has been recorded in the VRE unit. In the event of a teleconference cancellation, the teleconference reservation notifier notifies respective participants of the teleconference cancellation on receiving a cancellation request from the teleconference sponsor, and deletes the teleconference data from the database.

The teleconference status confirmer notifies the teleconference sponsor or a teleconference participant e.g. of the date and time of a teleconference run, in response to an inquiry. A user can obtain the teleconference data by specifying a teleconference ID.

The teleconference absence notifier notifies other teleconference participants of a subscriber's absence from the teleconference and deletes his name from the database, on receiving an absentee's request for an absence notification.

The structure of this invention thus described enables a teleconference run to be automatically notified to all participants by reserving in advance the teleconference run. It also enables the exchange to automatically connect the teleconference participants online at the specified time on the designated date of the teleconference run, thereby actually holding a teleconference.

Furthermore, it enables a teleconference cancellation to be automatically notified to all teleconference participants by canceling the reservation of a scheduled teleconference.

Additionally, it enables the teleconference participants to obtain the pertinent teleconference data at their convenience. Moreover, it enables a subscriber's absence to be automatically notified to the teleconference sponsor and other teleconference participants, when the an absenting subscriber notifies the system of his absence.

Lastly, it does not negatively effect a conventional exchange due to a functional complication, because the SCP (Service Control Point) provided outside of the exchange performs the processes.

BRIEF DESCRIPTION OF THE DRAWINGS

One of skill in the art can easily understand additional features and objects of this invention from the description of the preferred embodiments and some of the attached drawings. In the drawings.

DESCRIPTION OF THE PREFERRED EMBODIMENTS

Explanation of the Underlying Principles

Figure 1:
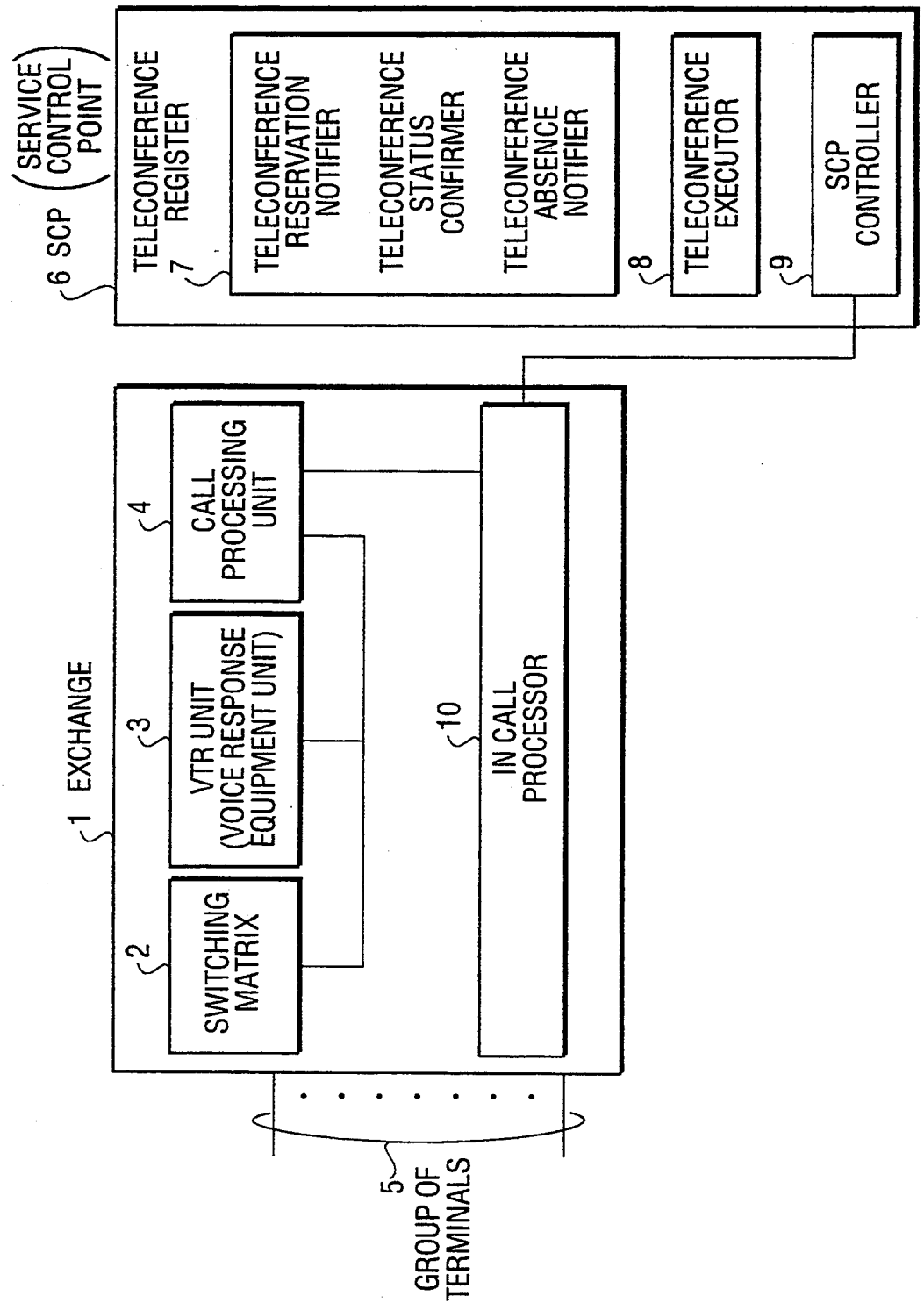
FIG. 1 is a block diagram of this invention.

FIG. 1 is a block diagram of this invention.

This invention is premised on an exchange 1 comprising a switching matrix 2, a VRE (Voice Response Equipment) unit 3 having a recording function, and a call processing unit 4, in addition to a SCP (Service Control Point) 6 for executing various kinds of services including a teleconference service.

A teleconference registerer 7 provided in the SCP 6 comprises a teleconference reservation notifier, a teleconference status confirmer and a teleconference absence notifier.

The teleconference reservation notifier registers in a database, the participants's names and the date and time of a teleconference run dictated by a terminal (used by a teleconference sponsor) among the group of terminals 5. It also notifies respective teleconference participants of a teleconference run, has the VRE unit 3 record voice messages of the teleconference sponsor, and sends the voice messages to other participants. In addition, in the event of a teleconference cancellation, on receiving a cancellation request from the teleconference sponsor, it notifies all the teleconference participants of the teleconference cancellation and deletes corresponding teleconference data from the database.

The teleconference status confirmer notifies the teleconference sponsor or a teleconference participant e.g. of the date and time of a teleconference run, in response to an inquiry. A user can obtain the teleconference data by specifying a teleconference ID.

The teleconference absence notifier notifies other teleconference participants of a subscriber's absence from the teleconference and deletes his name from the database, on receiving an absentee's request for an absence notification.

A teleconference executor 8, also provided in the SCP 6, calls up respective teleconference participants on the date and time of the teleconference run registered in the database and connects their terminals online, thereby holding the teleconference.

An SCP controller 9 also provided in the SCP 6 controls the teleconference registerer 7 and the teleconference executor 8 and becomes an interface for exchanging instructions with the exchange 1.

Lastly, an IN call processor. 10 provided in the exchange 1 performs a mutual conversion between an instruction of the exchange 1 and an IN message of the SCP 6. More specifically, the IN call processor 10 operates as an interface between the exchange 1 and the SCP 6. Being a conventional exchange, the exchange 1 cannot process an IN (Intelligent Network) message used by the SCP (Service Control Point) 6. This is why the IN call processor 10 replaces an IN message received from the SCP 6 by an instruction processable by the exchange 1 and converts an instruction issued by the exchange 1 for the SCP 6 into an IN message for its output.

The operations of the configuration under these principles are explained below.

First, assume that a user, using a terminal among the group of terminal 5, requests a teleconference run. In this case, the user (call originating subscriber) issues a request for reserving a teleconference run from his terminal to the exchange 1. The call processing unit 4 in the exchange 1 receives the request, and supplies the request to the IN call processor 10 on judging that the request is for the SCP 6. The IN call processor 10 converts this request into an IN (Intelligent Network) message for its emission to the SCP 6. The SCP controller 9 in the SCP 6 receives the IN message and analyzes its content. On judging that it is a request for reserving a teleconference run, the SCP controller 9 invokes the teleconference reservation notifier in the teleconference registerer 7 also provided in the SCP 6.

Getting invoked, the teleconference reservation notifier sends, via the SCP controller 9 to the exchange 1, an instruction for obtaining data necessary for reserving a teleconference run, i.e. data such as the names of the teleconference participants and the date and time of the teleconference run. At this time, the teleconference reservation notifier has the instruction include the ID number of a voice message to be sent to the call originating subscriber. The IN call processor 10 in the exchange 1 converts the received instruction into an instruction form processable by the call processing unit 4. The IN call processor 10 converts the ID number of a voice message into an input parameter for the VRE unit 3 for its emission to the call processing unit 4. On receiving the input parameter from the call processing unit 4, the VRE unit 3 sends a pertinent voice message to the call originating subscriber. This allows the call originating subscriber to receive a voice procedural explanation e.g. "Please indicate the date and time of the teleconference."

The call originating subscriber sequentially inputs the data necessary for reserving a teleconference run according to the voice message for its emission via the call processing unit 4 to the IN call processor 10. The IN call processor 10 then converts it to an IN message for its emission to the SCP 6. The SCP 6 sends the received data via the SCP controller 9 to teleconference reservation notifier in the teleconference registerer 7. The teleconference reservation notifier registers, in the database, the data (the names of the teleconference participants and the date and time of the teleconference run) necessary for reserving the teleconference run together with a teleconference ID.

Then, the teleconference reservation notifier notifies the teleconference participants dictated by the call originating subscriber of a teleconference run. More specifically, the teleconference reservation notifier emits, via the SCP controller 9 to the exchange 1, a call reception instruction for a teleconference participant, including a message e.g. regarding the date and time of the teleconference run. The IN call processor 10 in the exchange 1 converts the call reception instruction into an instruction processable by the call processing unit 4 for its emission to the call processing unit 4, which calls up the participant and notifies him of a teleconference run in a voice message by using the VRE unit 3.

The above operations enable the process for reserving a teleconference run by a call originating subscriber and the process for notifying the teleconference participants of the teleconference run to be executed.

The teleconference reservation notifier in the teleconference registerer 7 may execute the process for canceling a scheduled teleconference run. In this case, the call originating subscriber controlling the teleconference issues to the exchange 1 a request for canceling the teleconference. The call processing unit 4 in the exchange 1 receives the request and supplies the request to the IN processor 10 on judging the request is for the SCP 6. The IN call processor 10 converts the request into an IN (Intelligent Network) message for its emission to the SCP 6. The SCP controller 9 in the SCP 6 receives the IN message and analyzes its content, and invokes the teleconference reservation notifier in the teleconference registerer 7 on judging that the IN message is a request for canceling the teleconference.

Getting invoked, the teleconference reservation notifier sends, via the SCP controller 9 to the exchange 1, an instruction for obtaining an ID number of the canceled teleconference. At this time, the teleconference reservation notifier has the instruction include the ID number of a voice message for inquiring the ID number of the canceled teleconference. On receiving the instruction from the SCP controller 9, the IN call processor 10 converts the instruction to an instruction form processable by the call processing unit 4, and converts the ID number of a voice message to an input parameter for the VRE unit 3 for its emission to the call processing unit 4. On receiving the input parameter from the call processing unit 4, the VRE unit 3 sends a pertinent voice message for the call originating subscriber. This allows the call originating subscriber to receive a voice procedural explanation e.g. "Please indicate the teleconference ID."

The call originating subscriber inputs the ID number of the canceled teleconference for its emission via the call processing unit 4 to the IN call processor 10. The IN call processor 10 then converts it to an IN message for its emission to the SCP 6. The SCP 6 sends the received data via the SCP controller 9 to the teleconference reservation notifier in the teleconference registerer 7. The teleconference reservation notifier issues an instruction for sending a message for canceling the teleconference run to respective teleconference participants stored in the database together with the teleconference ID. The instruction is sent via the SCP controller 9 to the IN call processor 10 in the exchange 1, which converts the instruction to an instruction form processable by the call processor 4 for its emission to the call processor 4. Then, the call processor 4 calls up the participant and sends a notification for canceling a teleconference in a voice message via the VRE unit 3.

The above operations enable the teleconference reservation notifier in the teleconference registerer 7 to execute the process for reserving a teleconference run and the process for notifying all the participants of the teleconference run, as well as the process for canceling a scheduled teleconference and the process for notifying all the teleconference participants of the cancellation.

Each teleconference participant can confirm a teleconference status before a teleconference run, by making a request for confirming a teleconference status to an exchange 1 from any terminal among the group of terminals 5. The call processing unit 4 in the exchange 1 receives the request, and passes the request on to the IN call processor 10 on judging that the request is for the SCP 6. The IN call processor 10 converts the request to an IN (Intelligent Network) message for its emission to the SCP 6. The SCP controller 9 in the SCP 6 receives the IN message and analyzes its content, and invokes the teleconference status confirmer in the teleconference registerer 7 on judging that the IN message is a request for confirming the teleconference status.

Getting invoked, the teleconference status confirmer sends, via the SCP controller 9 to the exchange 1, an instruction for obtaining an ID number of the teleconference whose status is confirmed. At this time, the teleconference status confirmer has the instruction include the ID number of a voice message to be sent to the teleconference participant making the request for status confirmation. On receiving the instruction from the SCP controller 9, the IN call processor 10 converts the instruction to an instruction form processable by the call processing unit 4, and converts the ID number of a voice message to an input parameter for the VRE unit 3 for its emission to the call processing unit 4. On receiving the input parameter from the call processing unit 4, the VRE unit 3 sends a pertinent voice message for the teleconference participant making the request for status confirmation. This allows the teleconference participant to receive a voice procedural explanation e.g. "Please indicate the teleconference ID."

The teleconference participant inputs the ID number of the teleconference whose status confirmation he/she requests for its emission via the call processing unit 4 to the IN call processor 10. The IN call processor 10 then converts it to an IN message for its emission to the SCP 6. The SCP 6 sends the received data via the SCP controller 9 to the teleconference status confirmer in the teleconference registerer 7. The teleconference status confirmer searches the teleconference data stored in the database registered together with the teleconference ID. The teleconference reservation notifier has registered in the database the teleconference ID for use as a key in a search for pertinent teleconference data such as the scheduled date and time.

The searched data are sent via the SCP controller 9 to the IN call processor 10 in the exchange 1, which converts the IN message to an instruction form processable by the call processor 4 for its emission to the call processor 4. Then, the call processor 4 calls up the teleconference participant and sends pertinent teleconference data e.g. on the scheduled date and time in a voice message by invoking the VRE unit 3. The above operations enable the teleconference status confirmer in the teleconference registerer 7 to execute the process for allowing any of the teleconference participants to obtain pertinent teleconference data for its status confirmation.

An invited teleconference participant who is to be absent from a teleconference can make a request to the exchange 1 for sending an absence notice. The call processing unit 4 in the exchange 1 receives the request, and passes the request on to the IN call processor 10 on judging that the request is for the SCP 6. The IN call processor 10 converts the request to an IN (Intelligent Network) message for its emission to the SCP 6. The SCP controller 9 in the SCP 6 receives the IN message and analyzes it, and invokes the teleconference absence notifier in the teleconference registerer 7 on judging that the IN message is a request for sending an absence notice.

Getting invoked, the teleconference absence notifier in the teleconference registerer 7 sends, via the SCP controller 9 to the exchange 1, an instruction for obtaining an ID number of the teleconference which a teleconference participant cannot attend. At this time, the teleconference absence notifier has the instruction include the ID number of a voice message to be sent to the teleconference participant making the request for making an absence notice. On receiving the instruction from the SCP controller 9, the IN call processor 10 converts the instruction to an instruction form processable by the call processing unit 4, and converts the ID number of a voice message to an input parameter for the VRE unit 3 for its emission to the call processing unit 4. On receiving the input parameter from the call processing unit 4, the VRE unit 3 sends a pertinent voice message for the teleconference participant making the request for making an absence notice. This allows the teleconference participant to receive a voice procedural explanation e.g. "Please indicate the ID number of a teleconference you cannot attend."

The call originating subscriber inputs the ID number of the teleconference which he cannot attend for its emission via the call processing unit 4 to the IN call processor 10. The IN call processor 10 then converts it to an IN message for its emission to the SCP 6. The SCP 6 sends the received data via the SCP controller 9 to the teleconference absence notifier in the teleconference registerer 7. The teleconference absence notifier searches the teleconference stored in the database registered together with the teleconference ID. The teleconference reservation notifier has registered the teleconference ID in the database for use as a key in a search for pertinent teleconference data such as participants' names. The teleconference absence notifier deletes the absenting subscriber's name from the name list of teleconference participants.

An instruction for outputting a message that a subscriber is absenting to all other teleconference participants is sent via the SCP controller 9 to the IN call processor 10 in the exchange 1, which converts the IN message to an instruction form processable by the call processor 4 for its emission to the call processor 4. Then, the call processor 4 calls up all the other teleconference participants and sends an absence notice in a voice message by invoking the VRE unit 3. The above operations enable the teleconference absence notifier in the teleconference registerer 7 to execute the process for allowing the teleconference participants to obtain pertinent teleconference data about an absentee.

On reaching the date and time of a teleconference run registered in the database, the SCP controller 9 invokes the teleconference executor 8. The teleconference executor 8 calls up respective teleconference participants registered in the database for connecting their lines. That is, the teleconference executor 8 sends instructions for connecting lines of respective teleconference participants to the IN call processor 10 in the exchange 1 via the SCP controller 9 in an IN message form, which converts the instruction to an instruction form processable by the call processing unit 4. Getting invoked, the call processing unit 4 establishes a line connection between a teleconference participant and an exchange 1 on receiving the instruction.

By repeating these processes, respective line connections are established between all the teleconference participants and the exchange 1. Then, the teleconference executor 8 sends, as an IN message, an instruction for enabling all the teleconference participants to be put online for an actual teleconference via the SCP controller 9 to the IN call processor 10 in the exchange 1. The IN call processor 10 converts the IN message to an instruction executable by the call processing unit 4, which concatenates lines for enabling a teleconference to be performed. This enables a teleconference call to be formed for holding a teleconference.

Illustration of A Concrete Embodiment

The following is an illustration of a concrete embodiment of this invention.

Figure 2:
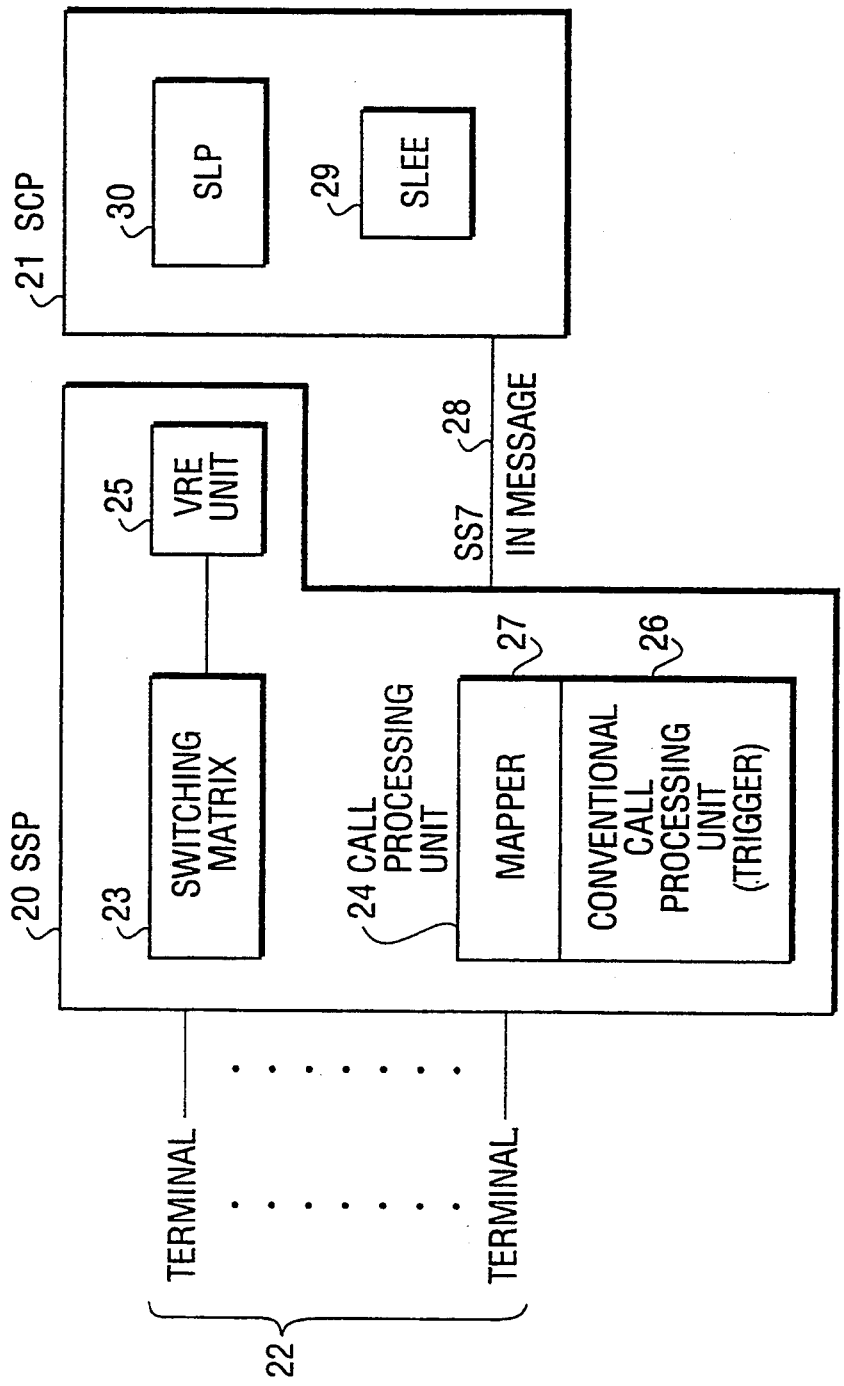
FIG. 2 shows the system configuration of a preferred embodiment of this invention.

FIG. 2 shows the system configuration of a preferred embodiment of this invention.

The system, which is a part of an IN (Intelligent Network), is realized as a combination of an SSP (Service Switching Point) 20 and an SCP (Service Control Point) 21.

The SSP 20 is an IN compatible exchange, and the SCP 21 is a computer for controlling various IN services. That is, the SCP 21 performs all the controls for teleconference services, and the SSP 20 controls a switching matrix 23 according to the instruction from the SCP 21, thereby connecting necessary terminals. A No. 7 common signal line (SS7) 28 connects the SSP 20 with the SCP 21.

The SSP 20 supports a terminal group 22 comprising a plurality of terminals. The SSP 20 comprises the switching matrix 23, a call processing unit 24 and a VRE (Voice Response Equipment) unit 25 having a voice recording function. The VRE unit 25 sends a voice message to a subscriber and records a voice message from a subscriber. A message ID number controls a voice message. When the call processing unit 24 stipulates a message ID number and a playing/recording instruction, the VRE unit 25 plays the voice message of the message ID number and records the voice message in a memory space having the message ID number.

The call processing unit 24 comprising a conventional call processing unit 26 and a mapper 27 has a mechanism for receiving an instruction from the SCP 21 attached to a conventional call processing unit.

The mapper 27 is software intermediating between an IN call processing and a conventional call processing. That is, although a conventional call processing performs a call connection by using a physical position of a subscriber line, an ISDN B channel number, a call reference number and a call memory number. However, an IN call processing does not distinguish any of these internal parameters dependent on an exchange. Therefore, an IN call processing uses a more abstract parameter. Hence, the mapper 27 performs a conversion between two [2] different call models, i.e. an IN call processing and a conventional call processing, and an interface with the SCP 21 pursuant to an IN call processing model. That is, a directive instruction over the SS7 28 between the SCP 21 and the SSP 20 is an IN message based on an IN call processing model.

The conventional call processor 26 has a trigger function attached, for detecting an IN call processing startup point by accessing the SCP 21 via the mapper 27 when a call is in a particular call state.

The SCP 21 for controlling the entirety of an IN service comprises an SLEE (Service Logic Execution Environment) 29 and an SLP (Service Logic Program) 30.

The SLP 30 is an application program for executing a teleconference service and comprises the following six [6] submodules.

[1] A Teleconference Registration Process

This is a process for receiving a registration performed by the teleconference sponsor.

[2] A Teleconference Run Notification Process

This is a process for notifying all teleconference participants of a teleconference run.

[3] A Teleconference Absence Notification Process

This is a process for notifying all other teleconference participants of an absentee on his request.

[4] A Teleconference Cancellation Process

This is a process for canceling a registered teleconference and notifying the teleconference participants of the cancellation.

[5] A Teleconference Status Confirmation Process

This is a process for responding to an inquiry from a teleconference participant about a scheduled teleconference run.

[6] A Teleconference Run Process

This is a process for holding a teleconference by connecting all the teleconference participants online, on the registered date and time of the teleconference run.

The SLP 30 comprises two [2] databases for storing necessary data in these six [6] submodules.

[1] A Subscriber Management Database

This is for managing the dial number of a terminal subscribing to this service and the corresponding subscriber's name and the teleconference ID in which the subscriber having the dial number participates. This enables a personal name to be inserted in a voice message by indicating the dial number when a subscriber needs to be notified of something. This also enables the ID number of the attending teleconference to be checked in the teleconference status confirmation process. Example:

| dial number | name | teleconference ID |
| --- | --- | --- |
| 7771234 | Mr. Brown | XXXXXXX |

[2] A Teleconference Management Database

This is for managing teleconference data, such as a "teleconference ID", a "controller", a "date and time of a teleconference run", and "attendees", as registered by the teleconference sponsor. The "teleconference ID" is attached by the teleconference registration in the SLP 30, and becomes a reference number of the teleconference. The "controller" is a teleconference participant sponsoring the teleconference. The "dial number" of the sponsoring participant is registered as the control number. The "date and time" is registered e.g. as "03301330" when the teleconference is held from 1330 hours (i.e. 0130PM) on March 30. The "attendees" register the dial numbers of all the teleconference participants. Example:

| teleconference ID | controller | date and time |
| --- | --- | --- |
| XXXXXXX | dial number 1 | 03301330 |
| | attendees | |
| | dial number 2, dial number 3 | |

The SLEE 29 performs an interface with the SSP 20 necessary for an IN call control and execution of the SLP 30. That is, the SLEE 29 selects an appropriate program submodule in the SLP 30 according to the data received from the SSP 20, and runs the execution routine of the program submodule.

Figure 3:
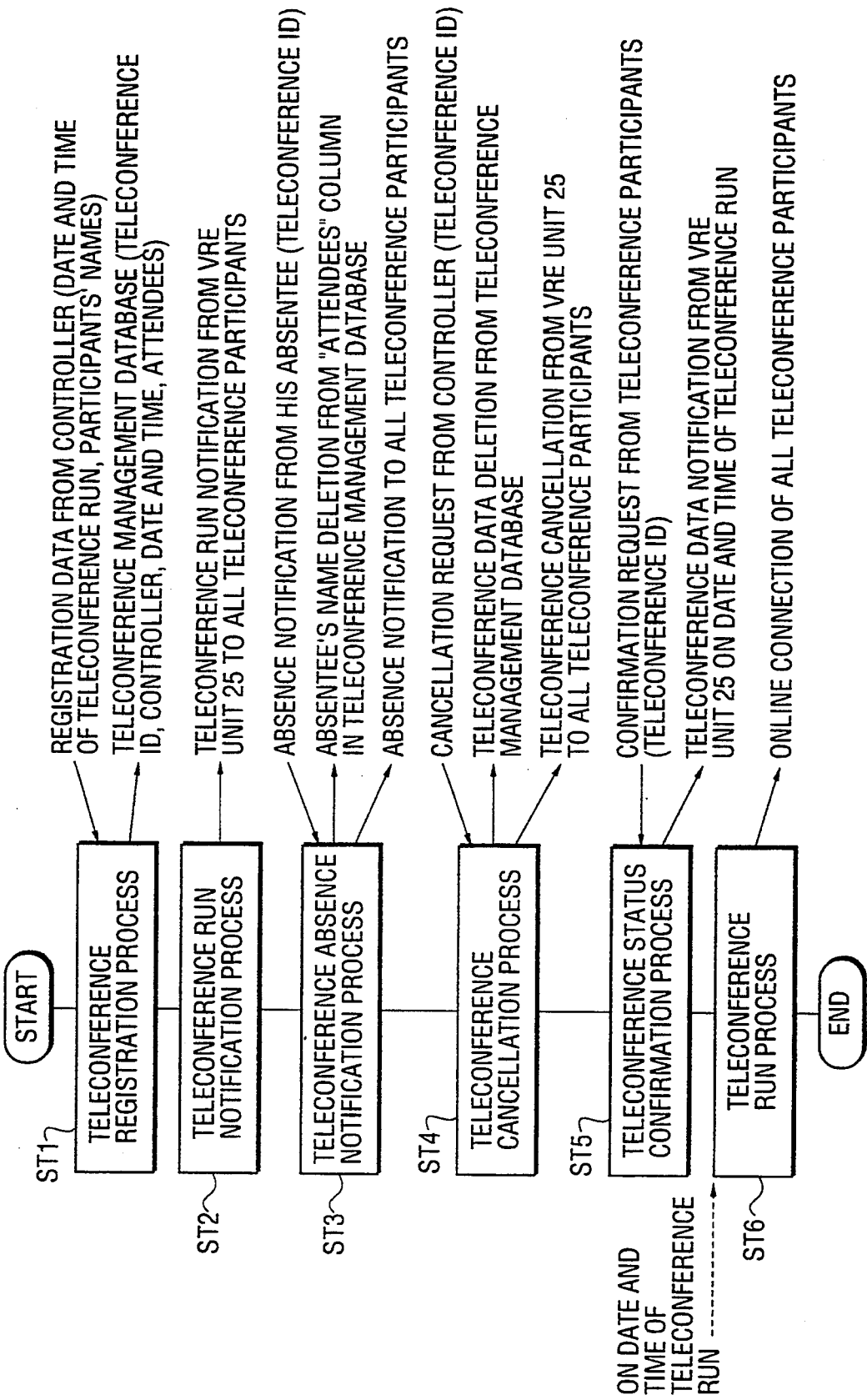
FIG. 3 is a flowchart showing the operations of a teleconference service.

FIG. 3 is a flowchart showing the operations of a teleconference service.

More specifically, FIG. 3 shows the flow of a teleconference service performed from the time when a teleconference sponsor (controller) registers a teleconference to the time when a teleconference is held.

ST1: A teleconference registration process (program submodule [1]) is executed on request of request by a controller for a teleconference registration. The teleconference registration process is to receive, from a controller, teleconference registration data on the names of teleconference participants and the date and time of a teleconference run and to store in the teleconference management database the teleconference registration data with a teleconference ID attached.

ST2: A teleconference run notification process (program submodule [2]) is invoked. That is, based on the data (comprising the teleconference ID, the date and time of a teleconference run and the names of teleconference participants) stored in the teleconference management database, a notification is made to all teleconference participants of the data in a voice message by a VRE unit 25.

A teleconference participant executes processes in ST3, ST4 and ST5, respectively corresponding to program submodules [3], [4] and [5] for a teleconference absence notification process, a teleconference cancellation process and a teleconference status confirmation process, at any time after the process in ST2 and before the process in ST6 (a teleconference run process) on request from a controller.

ST3, An absence notification request from a teleconference participant invokes a teleconference absence notification process (program submodule [3]). On receipt from an absentee of the ID number of a teleconference indicating that the absentee cannot attend, the absentee's name is deleted from the name list of the teleconference participants for the teleconference having the teleconference ID. Then, the fact that the absentee cannot attend the teleconference is announced to all the other teleconference participants in a voice message from the VRE unit 25.

ST4: A teleconference cancellation request from the controller invokes a teleconference cancellation process (program submodule [4]). On receiving from a controller an ID number of the teleconference that the controller cancels, the teleconference data related to the teleconference ID is deleted from the teleconference management database, and the cancellation of the teleconference is announced to all the teleconference participants in a voice message from the VRE unit 25.

ST5: A teleconference status confirmation request from any of the teleconference participants invokes a teleconference status confirmation process (program submodule [5]). On receiving from a teleconference participant the ID number of a teleconference whose status confirmation the teleconference participant requests, the teleconference participant reads the teleconference data related to the teleconference ID from the teleconference management database, the teleconference status is announced to the teleconference participant in a voice message from the VRE unit 25.

ST6: On reaching the date and time of a teleconference run, the SLEE 29 recognizes the date and time and invokes a teleconference run process (program submodule [6]). The teleconference run process enables a teleconference to be held by connecting the terminals of all the teleconference participants online on the date and time of a teleconference run.

A teleconference service is executed according to the above described flow.

Figure 4A:
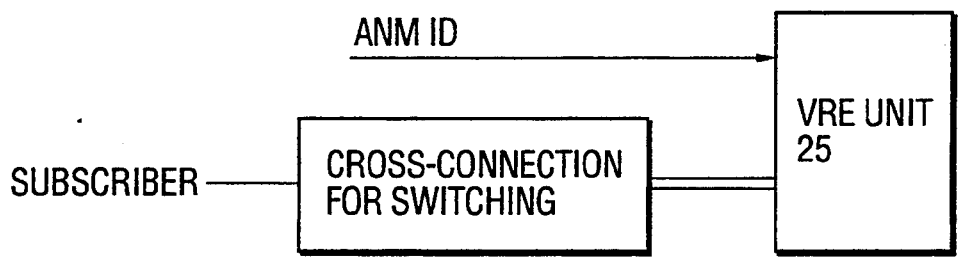
FIGS. 4A, 4B and 4C illustrate a VRE (Voice Response Equipment) control system.
Figure 4B:
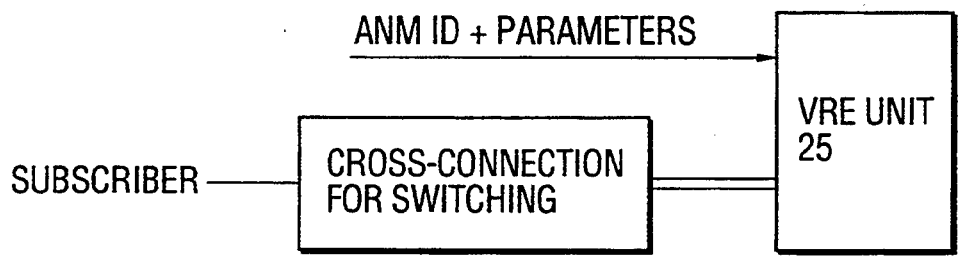
Figure 4C:
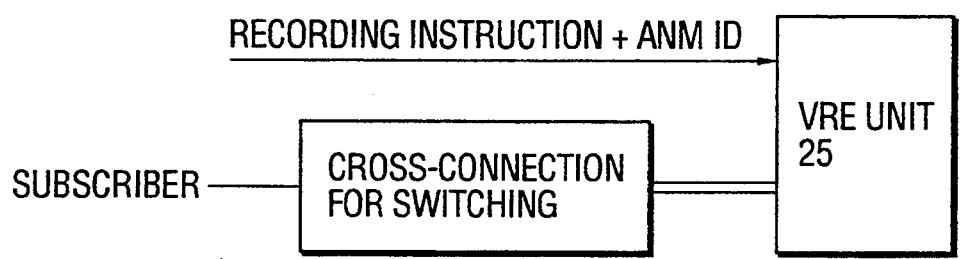

FIGS. 4A, 4B and 4C illustrate a VRE control system.

More specifically, FIGS. 4A, 4B and 4C illustrate the control system of the VRE unit 25 shown in FIG. 2. As explained earlier, the VRE unit 25 is a voice response equipment unit having a voice recording function. The switching matrix 23 as an intermediary for exchanging parameters necessary for processing connects the VRE 25 with the conventional call processing unit 26.

FIG. 4A shows a case of sending an ordinary routine announcement having no variable element, such as "Please input a dial number.". The conventional call processing unit 26 alludes an ANM ID (announcement identifier) for a cross-connection between subscribers and the VRE unit 25, thereby sending an announcement of the ANM ID.

FIG. 4B shows a case of sending an announcement having parameters and having a variable element. The conventional call processing unit 26 sends such an announcement to the VRE unit 25 by adding the parameter showing the content of a variable element to the ANM ID.

Assume for example, an announcement "XXX requests a teleconference run on YYY. The teleconference ID is ZZZ. The teleconference participants are AAA and BBB." alluded by the ANM ID. XXX is a parameter for the name of a teleconference sponsor. YYY is a parameter for the date and time of a teleconference run. ZZZ is a parameter for a teleconference ID. AAA and BBB are parameters for the names of the teleconference participants. Hence, the conventional call processing unit 26 inputs five [5] parameters to the VRE unit 25 in addition to an ANM ID, when an announcement is sent.

Assume further that XXX=Mr. Brown, YYY=03301330, AAA=Mr. Henley, and BBB=Mr. Jackson. These parameter values are substituted into the respective variable elements, thereby creating a message for an actual emission to a subscriber, which is "Mr. Brown requests a teleconference at 1330 on March 30. The teleconference ID is ZZZ. The teleconference participants will be Messrs. Henley and Jackson."

FIG. 4C shows a case of recording a voice by the VRE unit 25. The conventional call processor 26 sends a recording instruction and an MSG ID (message identifier) to the VRE unit 25. On receiving an instruction for indicating a start of a recording, an announcement is made for recording a voice message from a subscriber, thereby effecting a recording state. The announcement is, for example, "Please record your message after you hear a beep." The VRE unit 25 manages a recorded voice message by the MSG ID for a subsequent reference and retrieval.

The following is an explanation of an IN message exchanged between the SSP 20 and the SCP 21. An IN message has a message form in accordance with the IN (Intelligent Network) call processing model.

First, an IN message sent from the SSP 20 to the SCP 21 can be any of the four [4] kinds, which are a "QUERY" message, an "INFORMATION COLLECT RESPONSE" message, an "ANNOUNCEMENT RESPONSE" message and a "RECORD RESPONSE" message.

A "QUERY" message:

The SSP 20 uses a "QUERY" message for the purpose of transferring the input data invoking the SCP 21, after detecting a trigger indicating a process by the SCP 21. A "QUERY" message has the following three [3] parameters.

[1] A call originating DN (A dial number of a call originating subscriber)

[2] A leg ID (An identification corresponding to a call originating access interface)

[3] A special number (A service key indicating a service to be invoked)

An "INFORMATION COLLECT RESPONSE" message:

An "INFORMATION COLLECT RESPONSE" message is a response message responding to an "INFORMATION COLLECT" message sent from the SCP 21 to the SSP 20. An "INFORMATION COLLECT RESPONSE" message has the following four [4] parameters.

[1] Data on the date and time of starting a teleconference

[2] A dial number of a teleconference participant (A teleconference participant's DN)

[3] A recording management ID

A recording management ID is an MSG ID corresponding to a voice message registered by the teleconference sponsor. It enables a teleconference sponsor to send a voice message to a teleconference participant.

[4] A teleconference ID (A unique number assigned to a teleconference)

An "ANNOUNCEMENT RESPONSE" message:

An "ANNOUNCEMENT RESPONSE" message is an IN message responding to an "ANNOUNCEMENT" message sent from the SCP 21 to the SSP 20, indicating a completion of an announcement sending process.

A "RECORD RESPONSE" message:

A "RECORD RESPONSE" message is an IN message responding to a "RECORD" message sent from the SCP 21 to the SSP 20, indicating a completion of recording a voice message.

Second, an IN message sent from the SCP 21 to the SSP 20 can be any of the four [4] kinds, which are an "INFORMATION COLLECT" message, an "ANNOUNCEMENT" message, an "OFFER-CALL" message and a "RECORD" message.

An "INFORMATION COLLECT" message:

An "INFORMATION COLLECT" message is a message for instructing the SSP 20 to collect information generated by a subscriber or the SSP 20 and returning the collected information to the SCP 21 by an "INFORMATION COLLECT RESPONSE" message, coinciding an announcement emission to a stipulated leg ID. An "INFORMATION COLLECT" message has the following two [2] parameters.

[1] A leg ID

[2] An ANM ID (An announcement identification number)

An "ANNOUNCEMENT" message:

An "ANNOUNCEMENT" message is a message for instructing the SSP 20 to emit an "announcement" to a subscriber. An "ANNOUNCEMENT" message has only one [1] parameter;

[1] An ANM ID (An announcement identification number)

An "OFFER-CALL" message:

An "OFFER-CALL" message is an IN message for instructing a subscriber to receive a call. If it is necessary, an "OFFER-CALL" message may have a subscriber listen to the announcement on receipt of a call. An "OFFER-CALL" message has the following four [4] parameters;

[1] A call receiving DN (A dial number of a call receiving subscriber)

[2] A leg ID

[3] An ANM ID (An announcement identification number)

[4] An ANM parameter (A parameter of the words to be inserted to the variable elements of an announcement having the above ANM ID)

A "RECORD" message:

A "RECORD" message is a message for instructing a subscriber to record a voice message. A "RECORD" message has the following three [3] parameters:

[1] A leg ID

[2] An ANM ID

[3] A teleconference ID

The above described IN messages are used for message exchanges between the SSP 20 and the SCP 21.

The outlines of a teleconference registration process, a teleconference run notification process, a teleconference absence notification process, a teleconference cancellation process, a teleconference status confirmation process and a teleconference run process will be described below by referring to FIGS. 5 through 10, which are the sequence diagrams of respective processes.

Figure 5:
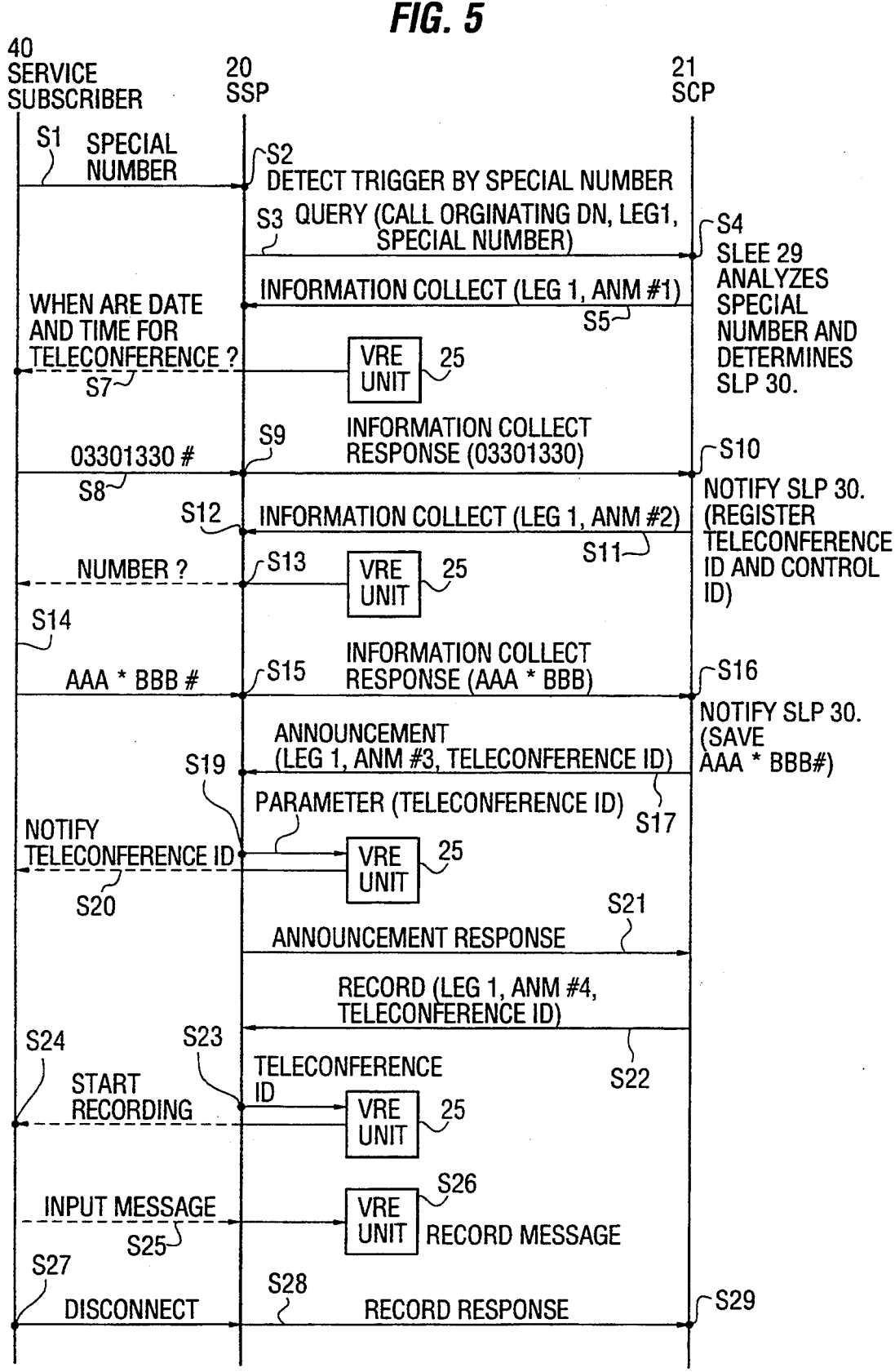
FIG. 5 shows the sequence of a teleconference registration process.

FIG. 5 shows the sequence of a teleconference registration process.

When a subscriber desires to hold a teleconference, he registers a teleconference in the system in pursuance of the sequence shown in FIG. 5. The sequence diagram expresses an interchange among a teleconference sponsor 40 registering a teleconference, the SSP 20 and the SCP 21.

S1: The teleconference sponsor 40 calls up the SSP 20 with an intention to register a teleconference and accesses a special number, e.g. 110, expressing a teleconference registration.

S2: The conventional call processing unit 26 in the SSP 20 detects, by this special number, a trigger that an access to the SCP 21 is necessary.

S3: On detecting the trigger, the conventional call processing unit 26 supplies defined data on a call originating subscriber's physical line, a used B channel number, etc., i.e., parameters for a conventional call processing, and supplies an event to the mapper 27. A "QUERY" message has as its parameters a call originating DN (a dial number of a call originating subscriber), a leg 1, which is a leg ID assigned to it, and this special number ("110" in this example).

S4: The SLEE 29 in the SCP 21 receives an incoming "QUERY" message, and determines a program submodule in the SLP 30 to be invoked by analyzing this special number (i.e. "110"). Because it is known in this case that the teleconference registration process needs to be invoked, the SLEE 29 invokes program submodule [1] for a teleconference registration process.

S5: Program submodule [1] for the teleconference registration process sends an "INFORMATION COL- LECT" message via the SS7 28 to the SCP 20. The "INFORMATION COLLECT" message has as its parameters the leg ID (e.g. leg 1) specified by a "QUERY" message and the ANM ID (e.g. ANM #1) of an announcement for inquiring the date and time of a teleconference run. It is assumed here that the ANM ID is predefined in the SLP 21.

On receiving an "INFORMATION COLLECT" message, the SSP 20 has the mapper 27 convert the leg ID (leg 1) to a conventional call processing parameter and the ANM ID (ANM #1) to an input parameter (MSG ID) for the VRE unit 25. The SSP 20 then hands the event accompanying these converted parameters over to the conventional call processing unit 26.

S7: The conventional call processing unit 26 invokes the VRE unit 25 by specifying a message identification (MSG ID) simultaneously with connecting leg 1 to the VRE unit 25, thereby sending an announcement corresponding to the message identification (MSG ID) to the call originating subscriber.

The announcement corresponding to ANM #1 is "Please specify the date and time of a teleconference. Please type in # at the end."

S8: The call originating subscriber types in, from his touch-tone telephone set, input data on the date and time of a teleconference run. For instance, the call originating subscriber types in as input data "03301330#" indicating that the teleconference run is at 1330 hours on March 30.

On receiving the data input, the conventional call processing unit 26 hands the event over to the mapper 27 "as is".

S9: The mapper 27 sends to the SCP 21 an "INFORMATION COLLECT RESPONSE" message into which the input data are substituted.

On receiving the above IN message, the SLEE 29 in the SCP 21 hands the input data included therein over to program submodule [1] for a teleconference registration process.

S10: Program submodule [1] for a teleconference registration process generates the teleconference ID for a teleconference the call originating subscriber wishes to hold and registers the teleconference data in the teleconference management database.

The content registered at this time is the teleconference ID, the teleconference controller and the date and time of a teleconference run. Accordingly, the teleconference management database has the following content, for example.

A teleconference ID=XXX
A teleconference controller=A call originating DN
A teleconference date and time=03301330

Thus, input data for a scheduled teleconference are collected, thereby completing the teleconference registration process.

Then, program submodule [1] for a teleconference registration process continues on to a process for collecting the dial numbers of the teleconference participants attending a teleconference.

S11: For this purpose, the "INFORMATION COLLECT" message is reemitted.

In this case, since the purpose is to collect the dial numbers of the teleconference participants, the "INFORMATION COLLECT" message has the two [2] parameters, LEG 1 and ANM #2, respectively indicating a connection with the call originating subscriber and the announcement ID (ANM ID) for collecting the dial numbers of teleconference participants.

S12: On receiving this message, the SSP 20 has the mapper 27 convert LEG 1 to a conventional call processing parameter and ANM #2 to an input parameter (MSG ID) of the VRE unit 25.

The SSP 20 then hands the event accompanying these converted parameters over to the conventional call processing unit 26.

S13: The conventional call processing unit 26 invokes the VRE unit 25 by specifying an MSG ID after connecting LEG 1 to the VRE unit 25, thereby sending to the call originating subscriber an announcement corresponding to the MSG ID. The message corresponding to ANM #2 is "Please specify the dial numbers of teleconference participants. Please type in # at the end."

S14: The call originating subscriber types in the dial numbers of the teleconference participants in the following format in response to the above message. "AAA*BBB#"

AAA and BBB respectively indicate the dial numbers of first and second teleconference participants. That is, a plurality of dial numbers of teleconference participants need only be segregated by "*"s in between and with a "#" attached at the end.

S15 On receiving the input data, the conventional call processing unit 26 hands the input data over to the mapper 27, which returns an "INFORMATION COLLECT RESPONSE" message into which the input data are substituted as the parameters.

S16: On receiving the "INFORMATION COLLECT RESPONSE" message, the SLEE 29 in the SCP 21 hands its internal data on the dial numbers of teleconference participants over to program submodule [1] for a teleconference registration, process for registering in the teleconference management database, the dial numbers of teleconference participants. That is, the teleconference management database has the following contents.

A teleconference ID=XXX
A teleconference controller=a call originating DN
A teleconference date and time=03301330
A dial number of teleconference participant=AAA
A dial number of teleconference participant=BBB S17: An announcement for a teleconference ID notification is sent to the call originating subscriber.

The parameters of the "ANNOUNCEMENT" message are LEG 1 ( the leg ID for connecting with the call originating subscriber ), ANM #3 ( the announcement ID of the announcement for a teleconference ID notification) and XXX (the teleconference ID number to be attached to the announcement). S19 On receiving the "ANNOUNCEMENT" message, the SSP 20 has the mapper 27 convert the "ANNOUNCEMENT" message to the parameters of a conventional call processing and hands the event over to the conventional call processing unit 26, which invokes the VRE unit 25 after connecting leg 1 with the VRE unit 25.

S20: At this time, the teleconference ID is sent, as a part of the data to be attached to the announcement, to the VRE unit 25, thereby enabling the call originating subscriber to receive an announcement "The teleconference ID is XXX."

S21: The conventional call processing unit 26 hands the event over to the mapper 27, on confirming that the VRE unit 25 has sent an announcement. The mapper 27 sends to the SCP 21 an "ANNOUNCEMENT RESPONSE" message indicating the completion of the announcement.

S22: On receiving an "ANNOUNCEMENT RESPONSE" message, the SLEE 29 in the SCP 21 has program submodule [1] for a teleconference registration process in the SLP 30 execute the following instruction. That is, program submodule [1] for a teleconference registration process sends, via the SLEE 29 to the SSP 30, a "RECORD" message for recording a message from the call originating subscriber.

The parameters of a "RECORD" message are LEG 1 (a leg ID for connecting the SSP 20 and the call originating subscriber), ANM #4 (an announcement ID to be attached to a voice message recorded by the call originating subscriber) and the teleconference ID.

S23: On receiving the record, the SSP 20 instructs the VRE unit 25 to record a voice message concurrently with notifying the VRE unit 25 of the teleconference ID.

S24: On receiving a recording instruction, the VRE unit 25 announces "Please speak the content of a voice mail after you hear a beep."

S25: The call originating subscriber speaks a voice message.

S26: The VRE unit 25 stores the recorded voice message by attaching the teleconference ID.

S27: The above steps enable the teleconference registration process to be concluded, thereby allowing the call originating subscriber to disconnect the line.

S28: The conventional call processing unit 26 in the SSP 20 detects a disconnection trigger and hands the event over to the mapper 27, which sends a "RECORD RESPONSE" message to the SCP 21.

S29: On receiving the "RECORD RESPONSE" message, the SLEE 29 in the SCP 21 concludes the execution of program submodule [1] for the teleconference registration process.

Figure 6:
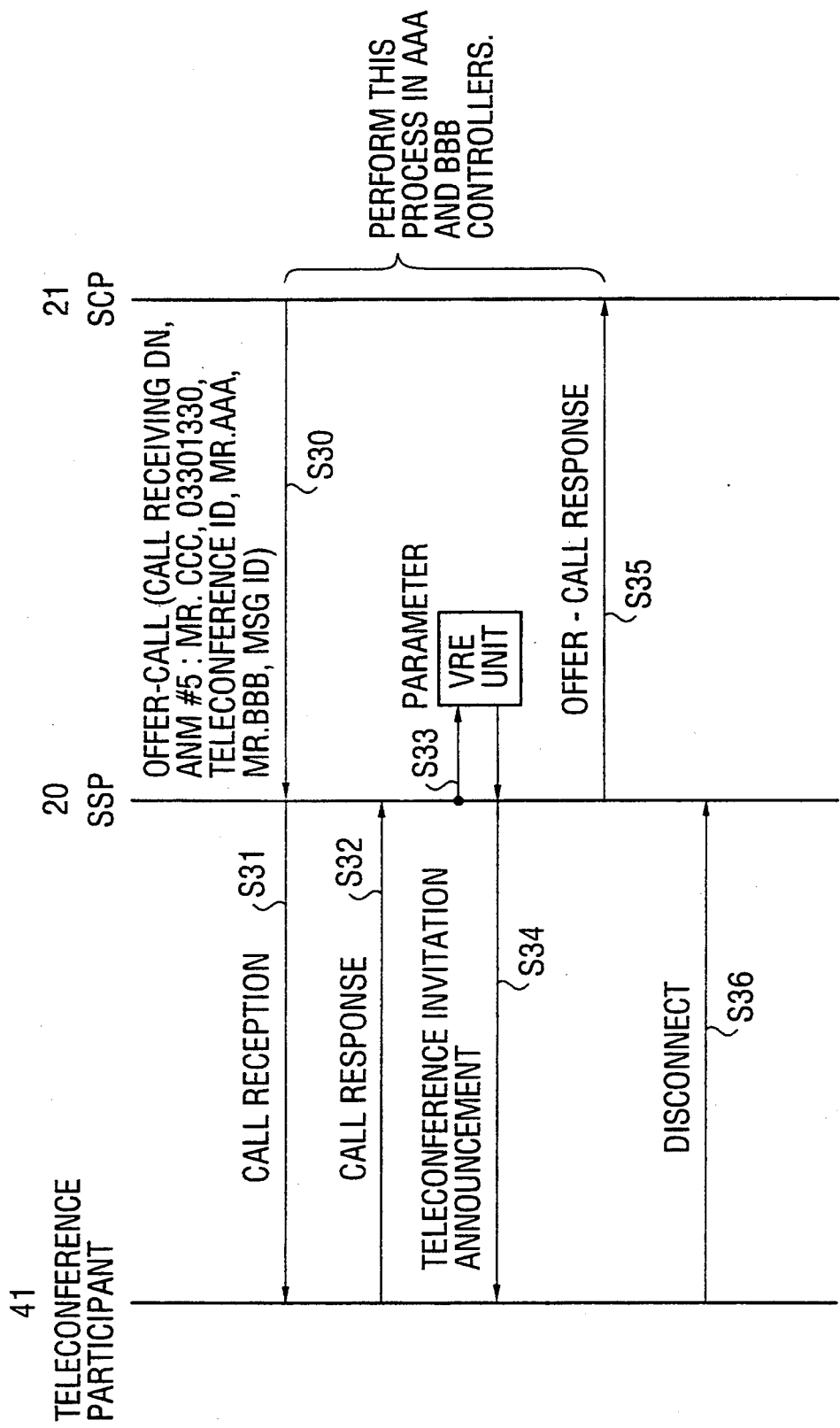
FIG. 6 shows the sequence of a teleconference run notification process.

FIG. 6 shows the sequence of notifying a teleconference run.

When the call originating subscriber completes the teleconference registration process, the system automatically continues to perform the teleconference run notification process, which program submodule [2] for a teleconference run notification process in the SLP 30 in the SCP 21 executes.

The SLEE 29 in the SCP 21 executes program submodule [2] for a teleconference run notification process, on completing the execution of program submodule [1] for a teleconference registration process in S29 as shown in FIG. 5.

First, program submodule [2] for a teleconference run notification process turns to the teleconference management database, and extracts the teleconference participants by referring to the teleconference run data of the currently registered teleconference ID. The teleconference participants for the teleconference having the teleconference ID "XXX" are "AAA" and "BBB".

S30: Program submodule [2] for a teleconference run notification process sends an "OFFER-CALL" message for having teleconference participant "AAA" to receive a call via the SLEE 29 to the SSP 30. Its parameters are "AAA", being a call receiving DN, (a dial number of a call receiving subscriber) and "ANM #5", being an ID for an announcement to be emitted on receiving a call, as well as some parameters for the words to be inserted into the announcement and an MSG ID being a voice message from the teleconference controller. For instance, ANM #5 is Mr. CCC making a request for a teleconference run at a time t1 on date d1 (03301330). The teleconference ID is XXX. The teleconference participants will be Messrs. AAA and BBB." The parameters for the "ANNOUNCEMENT" message are "CCC" being a dial number of a teleconference controller, "03301330" being data on the date and time for a teleconference run, the teleconference ID and the two [2] teleconference participants "AAA" and "BBB".

S31: On receiving the "OFFER-CALL" message, the SSP 20 has the mapper 27 convert it to parameters processable by the conventional call processing unit 26 and hands the event over to the conventional call processing unit 26, which has the terminal having the call terminating dial number receive a call.

S32: When the call is received, the call terminating dial number returns a response that a call is received.

S33: The conventional call processing unit 26 in the SSP 20 invokes the VRE unit 25 and sends the parameters for making the announcement.

S34: The VRE unit 25 sends the announcement corresponding to the announcement ID (ANM #5), e.g. "Brown Esq., makes a request for a teleconference run at 1330 hours on March 30. The teleconference ID is XXX. The teleconference participants will be Messrs. Hilton and Jackson.", accompanied by the voice message of Brown, Esq. who is the teleconference controller.

It is assumed here that the VRE unit 25 registers personal names such as Brown, Hilton and Jackson in correspondence with their dial numbers. The VRE unit 25 has already registered the emitted voice message from the teleconference controller in correspondence with the MSG ID.

S35: When the VRE unit 25 completes its message emission, the conventional call processing unit 26 in the SSP 20 hands the event over to the mapper 27, which sends an "OFFER-CALL RESPONSE" message to the SCP 21.

S36: A teleconference participant receiving a teleconference run notification disconnects his line after all the announcements are received.

The SSP 20 disconnects the line on receiving a disconnect instruction for terminating the teleconference run notification process. On receiving the "OFFER-CALL RESPONSE" message, the SLEE 29 in the SCP 21 confirms that the teleconference run notification to teleconference participant AAA is complete and moves on to the teleconference run notification process for the next teleconference participant BBB, which is similar to the teleconference run notification process for the next teleconference participant BBB.

The teleconference run notification process is performed for all the teleconference participants.

Figure 7:
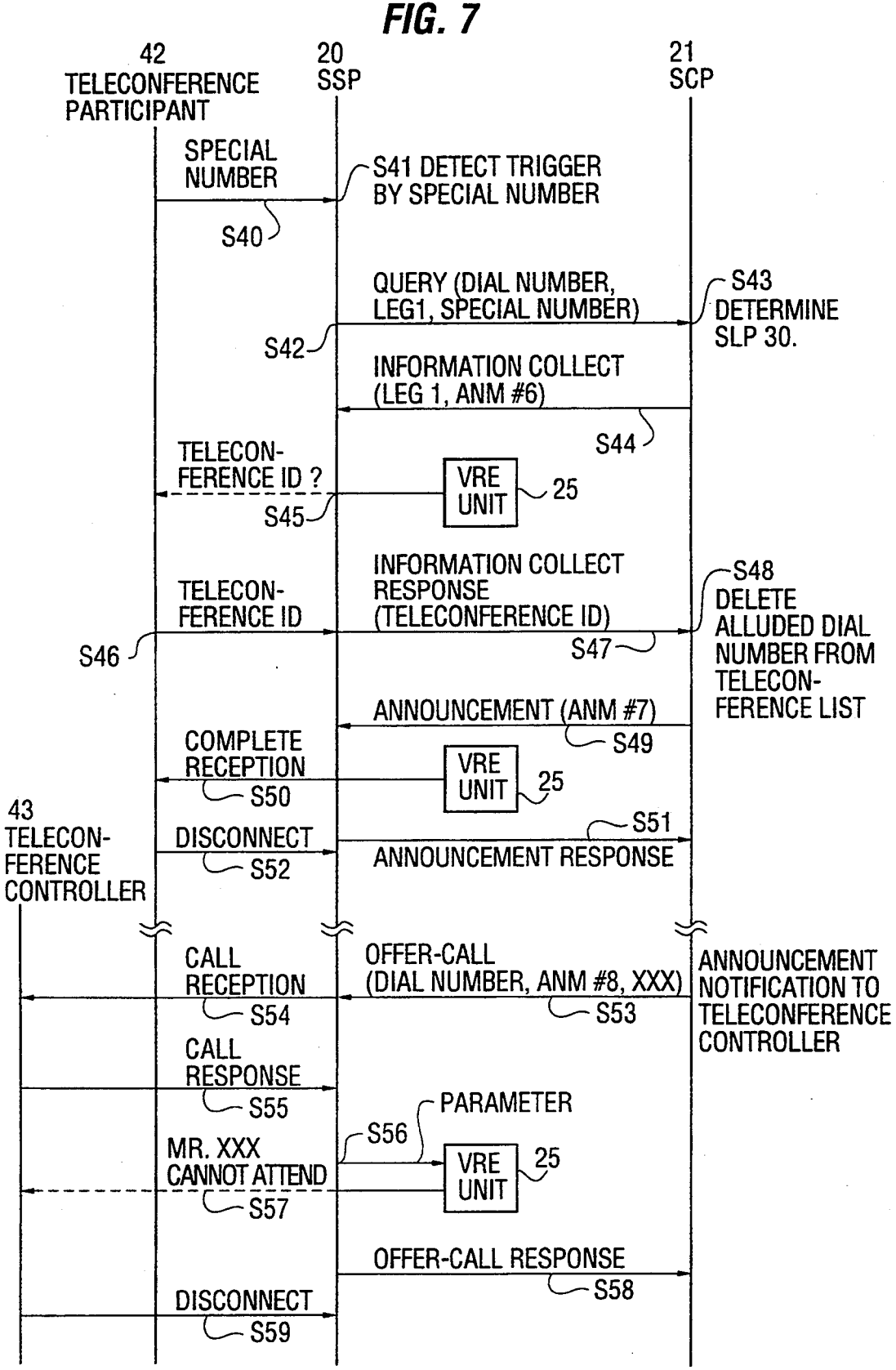
FIG. 7 shows the sequence of a teleconference absence notification process.

FIG. 7 shows the sequence of notifying an absence from a teleconference.

A teleconference absence notification process (program submodule [3] of the SLP 30) is explained below.

S40: A teleconference participant 42 who cannot attend a teleconference calls up the SSP 20 and inputs a special number, e.g. "114", indicating his intent to be absent from the teleconference.

S41: The conventional call processing unit 26 in the SSP 20 detects a trigger for calling the SCP 21 by using this special number ("114" in this example), and hands the event over to the mapper 27 by denoting conventional call processing parameters, which are data on the physical line of a call originating subscriber and used B channel number, for example.

S42: The mapper 27 assigns a leg ID (leg 1) to a generated call in accordance with an IN call processing model, and sends to the SCP 21 a "QUERY" message parametered by a call originating DN (a dial number of an absenting subscriber) and this special number (i.e. "114").

S43: On receipt of the "QUERY" message and analysis of the content thereof, the SCP 21 has the SLEE 29 select from the SLP 30 program submodule [3] for a teleconference absence notification process for its invocation.

S44: Program submodule [3] for a teleconference absence notification process causes an "INFORMATION COLLECT" message to be sent via the SLEE 29 to the SSP 20 for collecting the data on the teleconference that an absentee cannot attend. At this time, the parameters of the "INFORMATION COLLECT" message is LEG 1, being a leg ID for connecting the SSP 20 with a call originating subscriber, and ANM #6 being an ID number of an announcement to be emitted to the call originating subscriber.

S45: On receipt of the "INFORMATION COLLECT" message, the SSP 20 has the mapper 27 convert it to parameters in accordance with a conventional call processing model, and hands the event over to the conventional call processing unit 26, which connects the VRE unit 25 with the call originating subscriber and emits an announcement corresponding to ANM #6.

S46: An announcement is sent to the call originating subscriber, such as "Please input the ID number of the teleconference from which you intend to be absent."

S47: The conventional call processing unit 26 in the SSP 20 hands the received teleconference ID to the mapper 27, which sends, to the SCP 21, an "INFORMATION COLLECT RESPONSE" message parametered by the teleconference ID.

S48: The SCP 21 has the SLEE 29 receive an "INFORMATION COLLECT RESPONSE" message and hands the teleconference ID to program submodule [3] for a teleconference absence notification process, which searches the teleconference management database and deletes from the column of the teleconference participants the dial number of the call originating subscriber (teleconference participant 42) who cannot attend the teleconference.

S49: The SCP 21 has SLEE 29 send to the SSP 20 an "ANNOUNCEMENT" message (ANM #7) that the SCP 21 has received an absence notice from teleconference participant 42.

S50: The SSP 20 has the mapper 27 convert, pursuant to a conventional call processing model, the received "ANNOUNCEMENT" message to an instruction processable by the conventional call processing unit 26, which executes the instruction and invokes the VRE unit 25 for notifying the teleconference participant 42 of the complete reception.

S51: The mapper 27 sends an "ANNOUNCEMENT RESPONSE" message to the SCP 21 at the end of the announcement (ANM #7).

S52: The SCP 21 has the SLEE 29 confirm the end of the announcement on receiving the "ANNOUNCEMENT RESPONSE" message. The absentee, i.e. teleconference participant 42, disconnects the call on receiving the announcement of a complete acceptance of his absence notice.

On confirming the end of the announcement, the SLEE 29 moves on to the next step, in program submodule [3] for a teleconference absence notification process, for notifying the teleconference sponsor 40 of an absence of teleconference participant 42 from the teleconference.

S53: The SCP 21 sends, via SLEE 29 to the SSP 20, an "OFFER-CALL" message for announcing the absence of teleconference participant 42.

The dial number of the teleconference controller 43 is searched from the teleconference management database by using the teleconference ID. The "OFFER-CALL" message is parametered by the dial number of the teleconference controller 43, the announcement ID (ANM #8) and the dial number (XXX) of the absentee substituted into the "ANNOUNCEMENT" message having the announcement ID ANM #8.

S54: The SSP 20 has the teleconference controller 43 receive a call.

S55: The teleconference controller 43 sends a response to the SSP 20.

S56: The conventional call processing unit 26 connects the VRE unit 25 with the teleconference controller 43, and invokes the VRE unit 25 by sending the parameters of an "ANNOUNCEMENT" message.

S57: The VRE unit 25 announces to the teleconference controller 43 that "Mr. Henley will be absent from the teleconference whose ID number is XXX."

S58: On completing the annunciation, the conventional call processing unit 26 hands the event over to the mapper 27, which sends an "OFFER-CALL RESPONSE" message to the SCP 21. On receiving the "OFFER-CALL RESPONSE" message, the SCP 21 has the SLEE terminates the event by confirming that the teleconference absence notification process is over.

S59: The teleconference controller 43 disconnects the line on receiving the teleconference absence notification from the VRE unit 25.

The above steps enables the teleconference absence notification process to be perfected.

Figure 8:
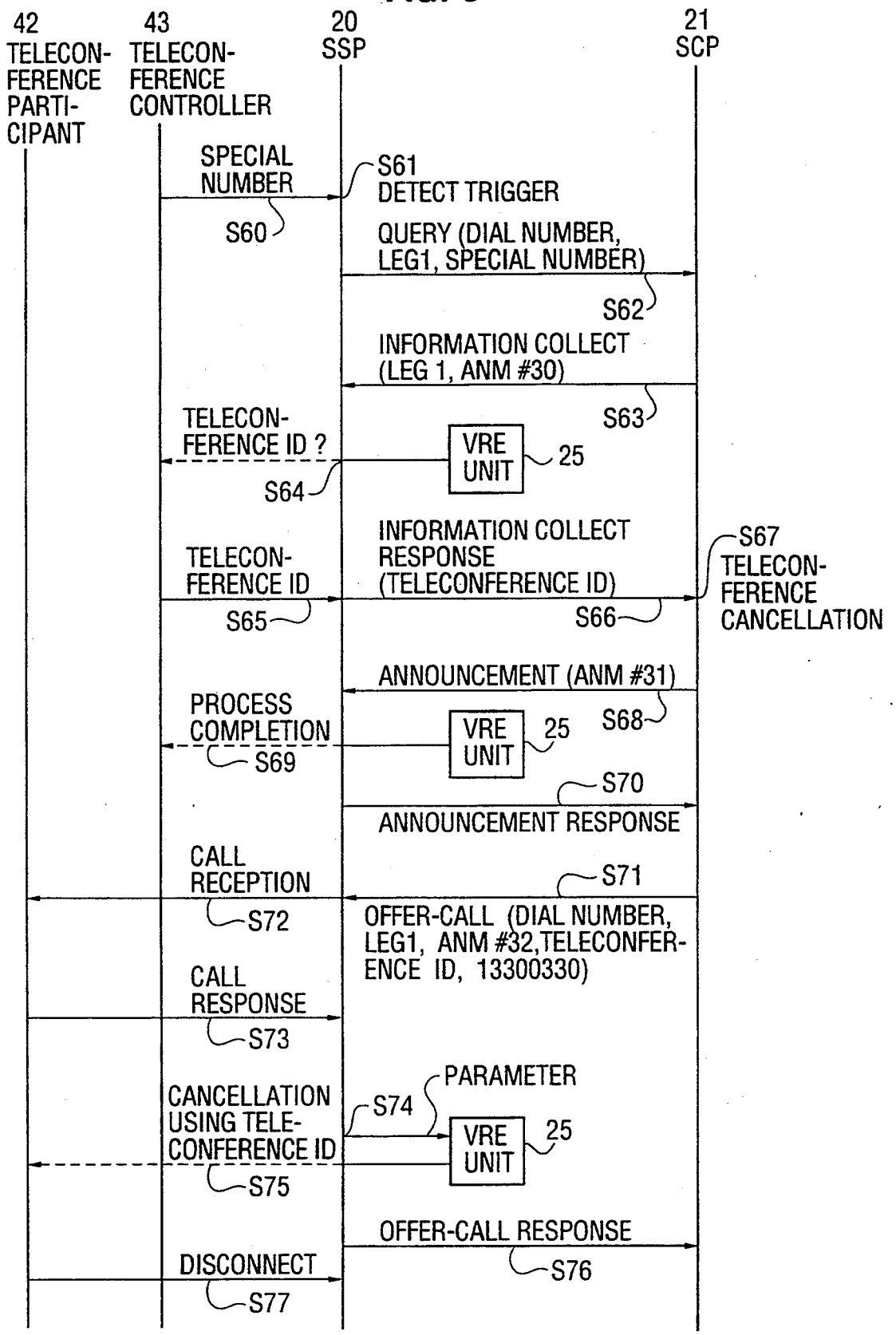
FIG. 8 shows the sequence of a teleconference cancellation process.

FIG. 8 shows the sequence of a teleconference cancellation.

More specifically, FIG. 8 shows the sequence of steps for allowing the teleconference controller 43 to cancel a teleconference already registered in the teleconference management database by deleting the pertinent teleconference data.

S60: When the teleconference controller 43 needs to cancel a teleconference, it sends to the SSP 20 a special number, e.g. "119", for canceling a teleconference.

S61: The conventional call processing unit 26 in the SSP 20 detects this special number ("119" in this example) as a trigger.

S62: By specifying the parameters, e.g. the physical line of a call originating subscriber and the used B channel number, for a conventional call processing, the SSP 20 hands the event over to the mapper 27, which sends to the SCP 21 a "QUERY" message parametered by the dial number of the call originating subscriber, the leg ID (LEG 1) for the generated call, and this special number (i.e. "119").

S63: On receipt of the "QUERY" message and analysis of the content thereof, the SCP has the SLEE 29 invoke program submodule [4] in the SLP 30 for a teleconference cancellation process, which sends, via the SLEE 29 to the SSP 20, an "INFORMATION COLLECT" message interrogating which teleconference to cancel. The "INFORMATION COLLECT" message is parametered by a leg ID (LEG 1) and an announcement ID (ANM #30).

S64: On receiving the "INFORMATION COLLECT" message, the SSP 20 has the mapper 27 convert it to parameters in accordance with a conventional call processing model. Then, the SSP 20 has the conventional call processing unit 26 connect the call originating subscriber (the teleconference participant 43) with the VRE unit 25, and invokes the VRE unit 25 for announcing to the teleconference controller 43 a message e.g. "Please input the ID number of the teleconference that you wish to cancel."

S65: The teleconference controller 43 inputs the ID number of the teleconference that he wishes to cancel pursuant to the annunciation.

S66: The conventional call processing unit 26 of the SSP 20 sends the teleconference ID to the mapper 27, which sends, to the SCP 21, an "INFORMATION COLLECT RESPONSE" message parametered by the teleconference ID.

S67: On receiving the "INFORMATION COLLECT RESPONSE" message, the SCP 21 has the SLEE 29 hand the teleconference ID over to program submodule [4] for a teleconference cancellation process for deleting from the teleconference management database the teleconference data having the teleconference ID.

S68: The SCP 21 sends to the SSP 20 an "ANNOUNCEMENT" message (ANN #31) for transmission to the teleconference controller 43 that the teleconference cancellation process is over.

S69: The SSP 20 has the mapper 27 convert the "ANNOUNCEMENT" message to parameters in accordance with a conventional call processing model, has the conventional call processing unit 26 to connect the teleconference controller 43 with the VRE unit 25, and invokes the VRE unit 25 for announcing to the teleconference controller 43 that the teleconference cancellation process is over.

S70: The SSP 20 has the mapper 27 to send to the SCP 21 the "ANNOUNCEMENT RESPONSE" message when the annunciation is over.

On receiving the "ANNOUNCEMENT RESPONSE" message, the SCP 21 notifies all the teleconference participants of the teleconference cancellation.

S71: The SCP 21 sends to the SSP 20 an offer call for notifying each teleconference participant registered in the teleconference management database of the cancellation of the teleconference to which he is invited. The offer call is parametered by the dial number of teleconference participant 42, the leg ID (leg 1) of a generated call, and the announcement ID (ANM #32), as well as variable elements (the teleconference ID and the date and time of the teleconference run).

S72: On receiving the "OFFER-CALL" message, the SSP 20 has the mapper 27 convert it to parameters in accordance with a conventional call processing model, and has the conventional call processing unit 26 have teleconference participant 42 receive a call.

S73: Teleconference participant 43 sends his response to the SSP 20 as a call response.

S74: The SSP 20 has the conventional call processing unit 26 connect the VRE 25 with teleconference participant 42, and invokes the VRE unit 25 by sending the parameters.

S75: The VRE unit 25 sends to teleconference participant. 42 a message, such as, for example, "The teleconference whose ID number is XXX scheduled to be held at 1330 hours on March 30 has been canceled."

S76: When the VRE unit 25 finishes sending the message, the mapper 27 sends an "OFFER-CALL RESPONSE" message to the SCP 21.

S77: On receiving the "OFFER-CALL RESPONSE" message, the SCP 21 has the SLEE 29 terminate the execution of program submodule [4] for the teleconference cancellation process. In addition, teleconference participant 42 disconnects the line on receiving the "OFFER-CALL RESPONSE" message.

Program submodule [4], for the teleconference cancellation process, notifies each teleconference participant supposed to attend the canceled teleconference of the teleconference cancellation.

Figure 9:
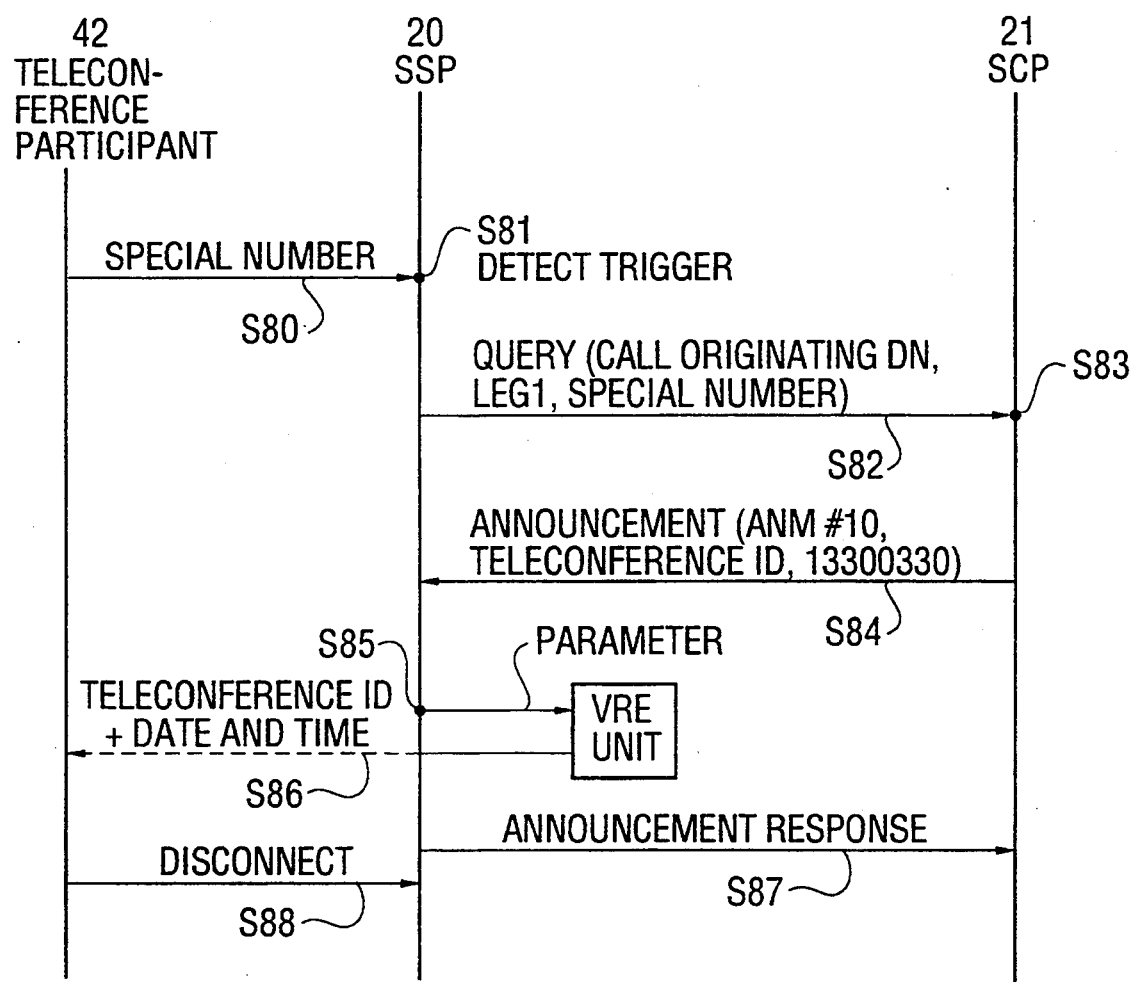
FIG. 9 shows the sequence of a teleconference status confirmation process.

FIG. 9 shows the sequence of a teleconference status confirmation process.

A teleconference participant can ask the system for a status confirmation of a scheduled teleconference at any time. This invokes program submodule [5] in the SLP 30.

S80: The teleconference participant asking for a status confirmation inputs a special number to the SSP 20.

S81: The SSP 20 has the conventional call processing unit 26 detect the special number as a trigger, and hands the event over to the mapper 27.

S82: The mapper 27 attaches a leg ID (LEG 1) to the generated call, and sends to the SCP 21 a "QUERY" message parametered by the dial number of the call originating subscriber (teleconference participant 42), the leg ID (leg 1) and the special number.

S83: On receipt of the "QUERY" message and analysis of the content thereof, the SLEE 29 in the SCP 21 invokes program submodule [5] in the SLP 30 for a teleconference status confirmation process in correspondence with the special number, thereby searching, in a subscriber database for retrieval, the teleconference specified by the dial number of the call originating subscriber (teleconference participant 42).

S84: The SCP 21 sends to the SSP 20 an "ANNOUNCEMENT" message parametered by an announcement ID (ANM #10) and its variable elements (the teleconference ID and the date and time of a teleconference run).

S85: On receiving the "ANNOUNCEMENT" message, the mapper 27 converts it to parameters in accordance with a conventional call processing model, has the conventional call processing unit 26 connect the dial number of the call originating subscriber (teleconference participant 42) with the VRE unit 25, and invokes the VRE unit 25 by sending the parameters.

S86: The VRE unit 25 notifies teleconference participant 42 of the teleconference ID and the date and time of the teleconference run.

S87: At the end of terminating the notification, the mapper 27 sends to the SCP 21 an "ANNOUNCEMENT RESPONSE" message, thereby allowing the SCP 21 to complete its process.

S88: On receiving the "ANNOUNCEMENT RESPONSE" message, teleconference participant 42 disconnects the line.

Figure 10:
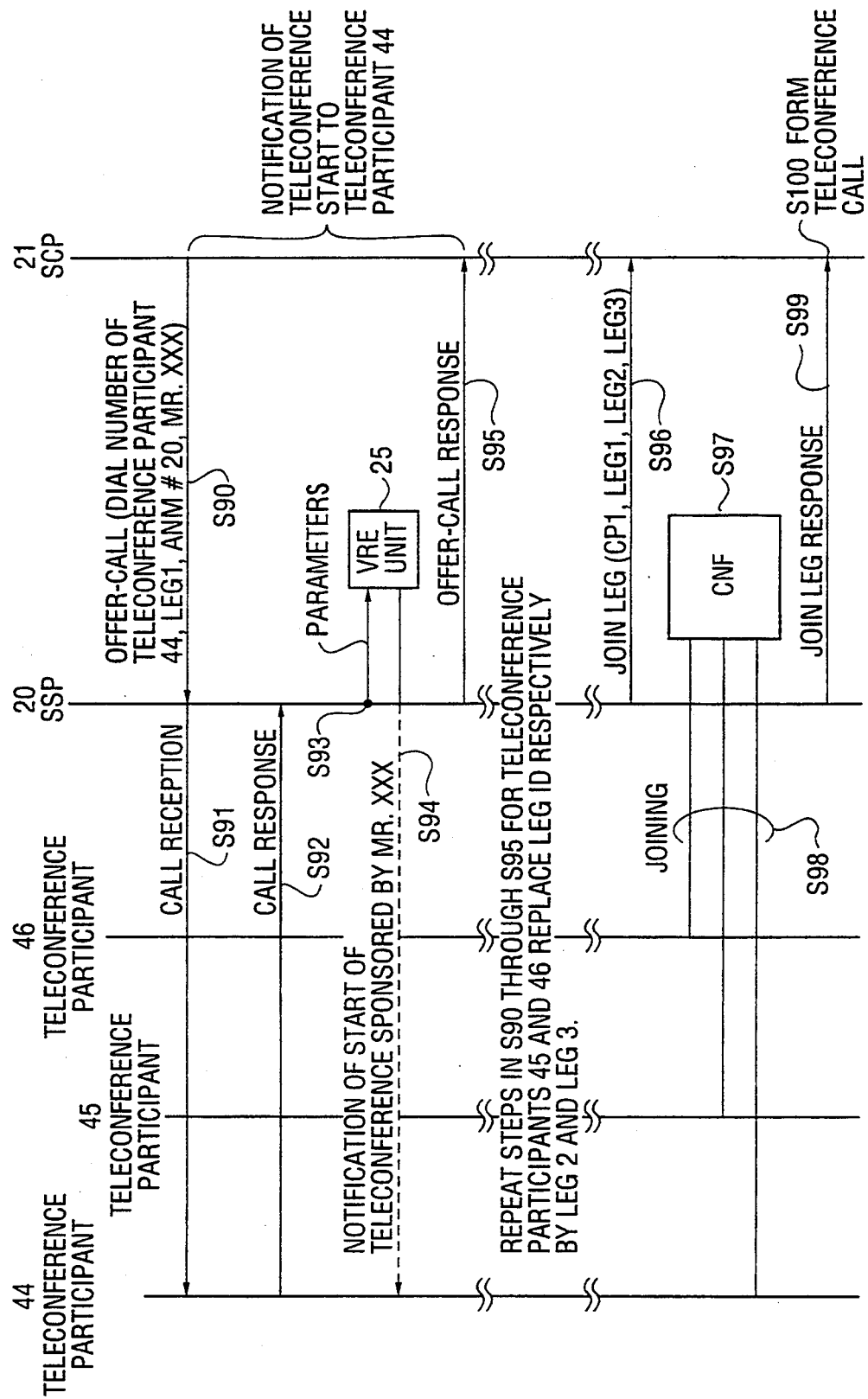
FIG. 10 shows the sequence of a teleconference run process.

FIG. 10 shows the sequence of a teleconference execution.

The SLEE 29 invokes subprogram [6] for a teleconference run process on the date and time of the teleconference run, which searches the teleconference management database for connecting the lines of the teleconference participants attending the teleconference.

The SLEE 29 invokes program submodule [6] for a teleconference run process on reaching the date and time of a teleconference run. Program submodule [6] searches the teleconference management database and connects the lines of the teleconference participants attending the teleconference, thereby announcing a teleconference start.

S90: The SCP 21 has the SLEE 29 first connect the line with a teleconference participant 44 for notifying the SSP 20 Of a teleconference start. Thus, program submodule [6] for a teleconference run process sends via the SLEE 29 to the SSP 20 an "OFFER-CALL" message parametered by the dial number of teleconference participant 44 who is being addressed, the leg ID (LEG 1) attached to the generated call, the announcement ID (ANM #20) and its parameter (Mr. XXX). Mr. XXX is the personal name of teleconference participant 44 that the subscriber database manages.

S91: On receiving the "OFFER-CALL" message, the SSP 20 has the mapper 27 convert the "OFFER-CALL" message to parameters in accordance with a conventional call processing model.

S92: On receiving a response from teleconference participant 44, the SSP 20 has the conventional call processor 26 connect the VRE unit 25 with teleconference participant 44.

S93: This allows the SSP 20 to send parameters to the VRE unit 25.

S94: The VRE unit 25 notifies teleconference participant 44 of a teleconference start, e.g. "Mr. XXX, please be ready for the start of a teleconference".

S95: The SSP 20 has the mapper 27 send to the SCP 21 of an "OFFER-CALL RESPONSE" message upon receiving a teleconference start notification, thereby allowing the SCP 21 to confirm that the teleconference participant 44 has received a teleconference start notification.

The above steps enable the SCP 21 to have teleconference participant 44 connect with the SSP 20 by an abstract concept leg 1.

The steps in S90 through S95 will be repeated for teleconference participants 45 and 46. At this time, it is assumed that these steps enable the SCP 21 to have teleconference participants 45 and 46 connect with the SSP 20 by abstract concepts leg 2 and leg 3.

The above steps enable teleconference participants 44, 45 and 46 to connect the SSP 20 with LEG 1, LEG 2 and LEG 3. At this time, although the teleconference participants 44, 45 and 46 respectively receive calls from the SSP 20, they are not yet connected together online.

S96: Therefore, when all the teleconference participants 44, 45 and 46 completely receive a call for a teleconference start notification, the SCP 21 has program submodule [6] in the SLP 30 for a teleconference run process send to the SSP 20 a "JOIN LEG" message for joining LEG 1, LEG 2 and LEG 3 together. The "JOIN LEG" message is parametered by an abstract name of a connecting point for joining a plurality of legs (CP 1: connection point 1) and a plurality of leg IDs (LEG 1, LEG 2 and LEG 3) which are joined together.

S97: On receiving the "join leg", the SSP 20 has the mapper 27 convert it to a teleconference trunk hunt request, which is a message processable by a conventional call processing model, and hands the event to the conventional call processing unit 26. The conventional call processing unit 26 provides a teleconference trunk CNF (connection trunk) in the SSP 20.

S98: Thereafter, when the mapper 27 outputs, to the conventional processing unit 26, an order for connecting a call corresponding to each leg ID with the teleconference trunk CNF, thereby allowing the conventional call processing unit 26 to connect all calls to the teleconference participants 44, 45 and 46 online to the teleconference trunk CNF, it enables a teleconference service to be put effective.

S99: When a teleconference service is activated, the mapper 27 sends a "JOIN LEG RESPONSE" message to the SCP 21.

S100: A receipt of the "JOIN LEG RESPONSE" message allows the SLEE 29 in the SCP 21 to confirm a formation of a teleconference call.

As described above, program submodules [1], [2], [4] and [6] in the SLP 30 respectively fulfill their intended purposes, i.e. a teleconference registration process, a teleconference run notification process, a teleconference cancellation notification process, and a teleconference run process. Also, program submodules [3] and [5] in the SLP 30 respectively perform their intended purposes for a teleconference absence notification process and a teleconference status confirmation process, which are optionally performed at the election of a teleconference participant.

What is claimed is:

1. A teleconference system featuring a call-up being a telephone service system comprised of a switching matrix, a VRE (voice response equipment) unit having a recording function and a call processing unit for executing a conventional call processing, an exchange connected with a group of terminals, such as telephone sets and terminal devices, having a plurality of users, each terminal corresponding with a respective one of said plurality of users and an SCP (service control point) for controlling various kinds of telephone line services, said telephone system featuring a call-up comprising:

teleconference registration means for registering, in said telephone service system, a reservation for a teleconference run by any of the users of said group of terminals, for notifying all teleconference participants of said teleconference run, for responding to a status confirmation request for the date and time of said teleconference run, and for notifying an attending teleconference participant of a teleconference participant who will be absent;

teleconference run means for holding a teleconference by automatically connecting all attending teleconference participants online on the date and time of said teleconference run registered by said teleconference registration means;

SCP control means for controlling said teleconference registration means and said teleconference run means separately from controlling said exchange; and IN (intelligent network) call processing means for replacing an instruction by said SCP control means by an instruction controllable by said exchange.

2. The teleconference system featuring a call-up according to claim 1, wherein said teleconference registration means comprises:

teleconference reservation notification means for registering a reservation of said teleconference run by any of the users of said group of terminals and for notifying all teleconference participants of said teleconference;

teleconference status confirmation means for automatically responding to a status confirmation request by a teleconference participant for an updated status of the date and time of said teleconference run; and teleconference reservation notification means for notifying in a batch attending teleconference participants of an absence of a teleconference participant invited by said teleconference reservation notification means, on receiving his or her absence notice.

3. The teleconference system featuring a call-up according to claim 2, wherein said teleconference reservation notification means in said teleconference registration means:

registers in a database, together with a teleconference ID (identifier), the date and time of said teleconference run and the names of teleconference participants specified by one of the plurality of users of said group of terminals, said one of said plurality of users being a teleconference sponsor;

has said VRE record a voice message of said teleconference sponsor; and notifies each of said teleconference participants, specified by said teleconference sponsor, of said date and time of said teleconference run in a voice message.

4. The teleconference system featuring a call-up according to claim 3, wherein said teleconference reservation notification means in said teleconference registration means:

deletes, from said database data on the date and time of said teleconference run, data on said names of teleconference participants and data on said teleconference ID, when said teleconference run having said teleconference ID is canceled; and notifies the teleconference participants of said canceled teleconference.

5. The teleconference system featuring a call-up according to claim 1, wherein said SCP control means:

controls said teleconference registration means in an SCP (service control point) independent of said exchange; and issues an IN (intelligent network) message pursuant to a No. 7 common line signal system (SS7) to interchange instructions with said exchange.

6. The teleconference system featuring a call-up according to claim 1, wherein said IN call processing means:

converts an IN (intelligent network) message sent from said SCP control means to said exchange to an instruction processable by said exchange; and sends, by converting to an IN message interpretable by said SCP, an instruction from said exchange to said SCP.

* * * * *

UNITED STATES PATENT AND TRADEMARK OFFICE
CERTIFICATE OF CORRECTION

PATENT NO. : 5,408,518  
DATED : April 18, 1995  
INVENTOR(S) : Hideo YUNOKI

Page 1 of 2

It is certified that error appears in the above-indentified patent and that said Letters Patent is hereby corrected as shown below:

Title page, item [57], line 9, delete [,] after "teleconference" first occurrence Col. 4  line 34, insert --,-- after "registers"  
Col. 11, line 38, delete [,] after "ST3", insert --:--  
Col. 12, line 32, insert --,-- after "Assume"  
Col. 13, line 68, delete [;] after "parameter", insert --:--  
Col. 14, line 9, delete [;] after "parameters", insert --:--  
Col. 16, line 24, insert --:-- after "S15"  
       line 33, delete [,] after "registration"  
       line 33, insert --,-- after "registering"  
Col. 16, line 50, "S19" starts a new line; insert --:-- after "S19"

UNITED STATES PATENT AND TRADEMARK OFFICE
CERTIFICATE OF CORRECTION

PATENT NO.  : 5,408,518
DATED       : April 18, 1995
INVENTOR(S) : Hideo YUNOKI

It is certified that error appears in the above-indentified patent and that said Letters Patent is hereby corrected as shown below:

Col. 21, line 60, delete [call response], insert instead
--"Call Response"--
Col. 22, line 29, delete [(leg 1)], insert --(Leg 1)--
Col. 23, line 60, delete ["join leg"], insert --"Join Leg"--
Col. 24, line 6, delete [put]

Signed and Sealed this

Fourth Day of July, 1995

Attest:

BRUCE LEHMAN

*Attesting Officer*     *Commissioner of Patents and Trademarks*